United States Patent [19]

Sano

[11] Patent Number: 5,282,138

[45] Date of Patent: Jan. 25, 1994

[54] CONTROL METHOD FOR AN ANTISKID BRAKING SYSTEM INCORPORATED IN A FOUR-WHEEL-DRIVE AUTOMOBILE

[75] Inventor: Yoshiaki Sano, Okazaki, Japan

[73] Assignee: Mitsubishi Jidosha Kogyo Kabushiki Kaisha, Tokyo, Japan

[21] Appl. No.: 713,865

[22] Filed: Jun. 12, 1991

[30] Foreign Application Priority Data

Jun. 15, 1990 [JP] Japan ................. 2-158509

[51] Int. Cl.⁵ .................... B60T 8/60; B60K 17/34
[52] U.S. Cl. .................... 364/426.03; 364/426.02; 303/104; 180/197
[58] Field of Search ............. 364/426.02, 426.03; 303/100, 103, 110; 180/179, 170

[56] References Cited

U.S. PATENT DOCUMENTS

| | | | |
|---|---|---|---|
| 4,717,209 | 1/1988 | Hagiya et al. | 303/103 |
| 4,740,040 | 4/1988 | Arikawa | 303/96 |
| 4,762,375 | 8/1988 | Maki et al. | 303/103 |
| 4,770,266 | 9/1988 | Yamaguchi et al. | 364/426.02 |
| 4,793,662 | 12/1988 | Arikawa | 303/100 |
| 5,051,907 | 9/1991 | Kuwana et al. | 364/426.02 |
| 5,070,460 | 12/1991 | Yasuno | 364/426.02 |
| 5,072,393 | 12/1991 | Mori et al. | 364/426.02 |
| 5,082,333 | 1/1992 | Fukushima et al. | 364/426.02 |
| 5,173,860 | 12/1992 | Walenty et al. | 364/426.02 |

*Primary Examiner*—Thomas G. Black
*Assistant Examiner*—Tan Q. Nguyen

[57] ABSTRACT

A control method is intended for controlling an antiskid braking system for a four-wheel-drive automobile in which the front and rear wheel sides are connected by a drive system. The control method includes a step of simultaneously reducing braking pressures on two rear wheels in accordance with the select-low principle when at least one of the rear wheels tends to lock. The step includes a process for reducing the braking pressure on that front wheel which is situated on the same side as the selected rear wheel determined in accordance with the select-low principle at the same time with the braking pressures on the rear wheels.

14 Claims, 9 Drawing Sheets

CONTROL METHOD FOR AN ANTISKID BRAKING SYSTEM INCORPORATED IN A FOUR-WHEEL-DRIVE AUTOMOBILE

BACKGROUND OF THE INVENTION

1. Field of the Invention

The present invention relates to a control method for an antiskid braking system for preventing wheels of an automobile from being locked when the automobile is braked, and more particularly, to a control method for an antiskid braking system adapted for use in a four-wheel-drive automobile.

2. Description of the Related Art

An antiskid braking system is used as a braking system for modern automobiles. This system is used to securely prevent wheels of an automobile from skidding or locking when the automobile is braked. Thus, the use of this system not only ensures the driving stability of the automobile, but also allows the braking distance to be shortened.

Conventional antiskid braking systems of this type include a so-called three-channel system. When the automobile is braked, according to the three-channel braking system, braking pressures on left and right front wheels of an automobile are controlled independently of each other in accordance with a tendency of each front wheel to skid, while braking pressures on left and right rear wheels are controlled together in accordance with a tendency of one of the rear wheels to skid. More specifically, the braking pressures on the rear wheels are controlled in accordance with the rotating behaviour of that rear wheel which more positively tends to skid.

When the three-channel antiskid braking system is applied to a four-wheel-drive automobile, the front and rear wheel sides are directly connected by means of a drive system. If the braking pressures on the front and rear wheel sides are independently controlled when the automobile is braked, therefore, a torsional torque in the drive system connecting the front and rear wheel sides increases. As a result, the speeds of the front and rear wheels are subject to undesired fluctuations, so that the braking pressures on the individual wheels cannot be controlled suitably and stably. The fluctuations of the wheel speeds induces vibrations of the body of the automobile, thereby making the automobile uncomfortable to ride in.

Conventionally, therefore, it is not advisable to apply the three-channel antiskid braking system to four-wheel-drive automobiles. Thus, if the three-channel antiskid braking system is incorporated in a part-time four-wheel-drive automobile, its operation may be prevented while the automobile is running in the four-wheel-drive mode, or otherwise, the drive mode of the automobile may be compulsorily switched from a four-wheel-drive mode to a two-wheel-drive mode.

SUMMARY OF THE INVENTION

The object of the present invention is to provide a control method for an antiskid braking system incorporated in a four-wheel-drive automobile, in which a torsional torque produced in a drive system, which restrains the rotational behaviours of the front and rear wheels of the automobile to each other, can be reduced during braking control. Thereby, the reliability of the braking control is ensured.

The above object is achieved by a control method for an antiskid braking system for a four-wheel-drive automobile according to the invention. The antiskid braking system comprises wheel speed sensors attached individually to left and right front wheels and left and right rear wheels of the automobile to detect and output the respective speeds of the wheels, wheel brakes attached individually to the four wheels, and control means for controlling the respective braking pressures of the wheel brakes. The control method comprises: a front control step for controlling the braking pressure of the wheel brake for one of the front wheels independently of the braking pressure of the wheel brake for the other front wheel by means of the control means, on the basis of the output of the wheel speed sensor for the one front wheel, when the one front wheel develops a tendency to lock; and a rear control step for simultaneously controlling the respective braking pressures of the wheel brakes for the two rear wheels by means of the control means, on the basis of the output of the wheel speed sensor for the concerned rear wheel whose tendency to lock is found to be higher by comparison between the rear wheels when at least one of the rear wheels develops a tendency to lock. The rear control step includes a process for reducing the braking pressure of the wheel brake for the target front wheel which is situated on the same side as the concerned rear wheel, by means of the control means, at the same time when the respective braking pressures of the wheel brakes for the two rear wheels are reduced.

According to the control method of the present invention described above, the braking pressures on the two rear wheels are naturally reduced together, if at least one of the rear wheels develops a tendency to lock, when the automobile starts to be braked while it is running in a four-wheel-drive mode. In this case, the braking pressure on that front wheel situated on the same side as the rear wheel, which more positively tends to lock, is reduced at the same time.

When the braking pressures on the rear wheels are reduced, therefore, the braking pressure on the one front wheel is also reduced at the same time, so that a torsional torque produced in a drive system, which connects the front and rear wheel sides, can be decreased. Thus, the respective speeds of the wheels can be prevented from fluctuating, so that the braking pressure control based on these wheel speeds can be effected with stability. The braking pressure on only one front wheel is reduced together with the braking pressures on the rear wheels, and that on the other front wheel is controlled independently thereof. Accordingly, a satisfactory braking force can be secured on the front wheel side.

The control method of the present invention may be also applied to an antiskid braking system incorporated in an automobile whose drive mode can be switched between a two-wheel-drive mode and a four-wheel-drive mode. In this case, it is advisable to suspend the aforementioned process even though the braking pressures on the rear wheels are reduced when one or both of the rear wheels tend to lock while the automobile is running in the two-wheel-drive mode. According to this control method, braking pressure control can be executed in an optimum manner without regard to the drive mode of the automobile, whether two-wheel-drive or four-wheel-drive. Thus, the braking performance of the so-called part-time four-wheel-drive automobiles can be improved in a wide variety of operating conditions.

The above and other objects, features, and advantages of the invention will be more apparent from the ensuing detailed description taken in connection with the accompanying drawings.

DETAILED DESCRIPTION OF THE PREFERRED EMBODIMENTS

Figure 1:
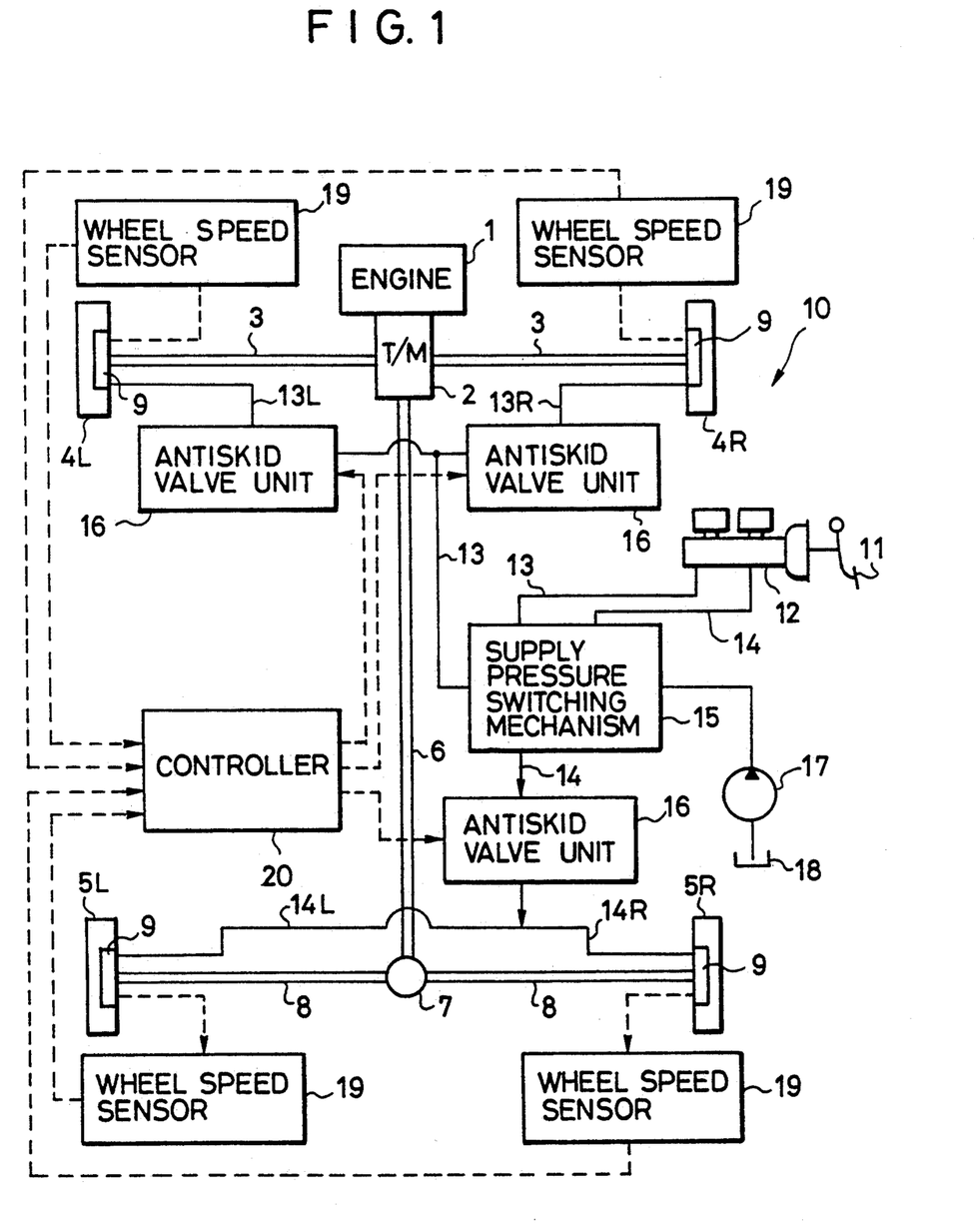
FIG. 1 is a schematic view showing an antiskid braking system according to one embodiment of the present invention.

Referring to FIG. 1, there is shown a four-wheel-drive automobile furnished with an antiskid braking system. A driving force generated from an engine 1 of the automobile is transmitted to left and right front wheels $4_L$ and $4_R$ through a transmission 2 and a pair of front axles 3. On the other hand, the driving force from the transmission 2 is transmitted to left and right rear wheels $5_L$ and $5_R$ through a transfer (not shown), propeller shaft 6, differential gear 7, and a pair of rear axles 8. In this case, therefore, the automobile is a part-time four-wheel-drive automobile.

Each of the front and rear wheels 4 and 5 is fitted with a wheel brake 9. These brakes 9 are connected to a hydraulic brake circuit 10. The brake circuit 10 is provided with a master cylinder 12 of a tandem type combined with a vacuum brake booster. The master cylinder 12 is actuated by means of the vacuum brake booster when a brake pedal 11 is worked.

The respective first ends of front and rear brake lines 13 and 14 are connected individually to two pressure chambers (not shown) of the master cylinder 12. The brake lines 13 and 14 extend via a supply pressure switching mechanism 15. A pair of branch lines $13_L$ and $13_R$ diverge from that part of the front brake line 13 situated on the downstream side of the switching mechanism 15, and are connected to the respective wheel brakes 9 of the left and right front wheels $4_L$ and $4_R$, respectively. Likewise, a pair of branch lines $14_L$ and $14_R$ diverge from that part of the rear brake line 14 situated on the downstream side of the switching mechanism 15, and are connected to the respective wheel brakes 9 of the left and right rear wheels $5_L$ and $5_R$, respectively.

An antiskid valve unit 16 is disposed on each of the branch lines $13_L$ and $13_R$ of the front brake line 13, while another valve unit 16 is disposed at that part of the rear brake line 14 situated between the switching mechanism 15 and the branch lines $14_L$ and $14_R$.

Further, a hydraulic pump 17 is connected to the switching mechanism 15. The pump 17 sucks up a pressure liquid in a reservoir tank 18, pressurizes the liquid to a predetermined pressure, and supplies it to the switching mechanism 15. During control operation for the antiskid braking system or ABS control, therefore, the respective wheel brakes 9 of the individual wheels are supplied, not with a static pressure from the master cylinder 12, but with a dynamic pressure from the hydraulic pump 17, by the agency of the switching mechanism 15. At this time, the antiskid valve unit for a wheel which tends to skid is actuated, whereby the pressure in the wheel brake 9 of this wheel, that is, the braking force on the wheel, is controlled.

Each of the front and rear wheels 4 and 5 is provided with a wheel speed sensor 19 which is used to control the switching operation for each corresponding antiskid valve unit 16 during the ABS control. These sensors 19 detect the respective speeds of their corresponding wheels, and supply their respective detection signals to a controller 20.

When the automobile is braked, the controller 20 calculates a pseudo body speed or a reference body speed on the basis of the detection signals from the individual wheel speed sensors 19. Based on the respective speeds of the wheels with respect to the calculated reference body speed, moreover, the controller 20 determines whether or not any of the wheels tends to lock or skid. If there is any wheel which tends to skid, the controller 20 delivers a control signal to the antiskid valve unit 16 corresponding to this wheel, so that the braking pressure of the wheel brake 9 associated with this valve unit 16 is properly controlled.

In FIG. 1, return lines connecting the reservoir tank 18 and the individual wheel brakes 9 are omitted for simplicity of illustration.

Figure 2:
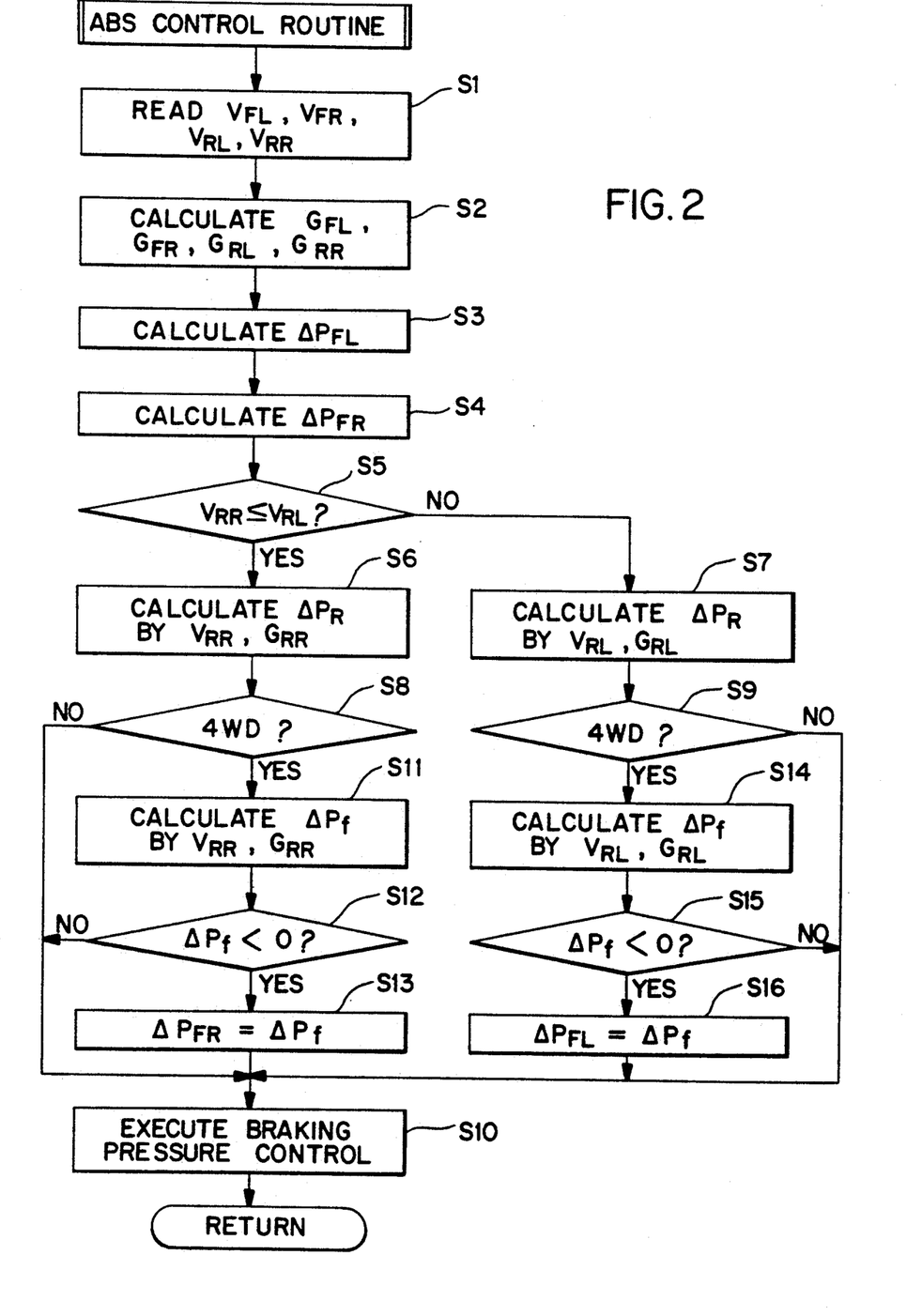
FIG. 2 is a flow chart illustrating a control routine for the system of the one embodiment.

The following is a description of a control method according to one embodiment of the present invention executed by means of the controller 20 in accordance with a control routine for the antiskid braking system (ABS) of FIG. 2. Here it is to be noted that the control routine is repeatedly executed in predetermined control cycles as the brake pedal 11 is worked.

CONTROL ROUTINE

When the ABS control is started by working the brake pedal 11, a speed $V_{FL}$ of the left front wheel $4_L$, speed $V_{FR}$ of the right front wheel $4_R$, speed $V_{RL}$ of the left rear wheel $5_L$, and speed $V_{RR}$ of the right rear wheel $5_R$ are first read in accordance with the outputs from the wheel speed sensors 19 in Step S1. In Step S2, wheel accelerations $G_{FL}$, $G_{FR}$, $G_{RL}$ and $G_{RR}$ are calculated on the basis of the wheel speeds $V_{FL}$, $V_{FR}$, $V_{RL}$ and $V_{RR}$, respectively. Each wheel acceleration can be calculated as follows:

$$G_x = V_{x(n)} - V_{x(n-1)},$$

where X is a subscript which represents any of FL, FR, RL and RR, $V_{(n)}$ and $V_{x(n-1)}$ indicate the wheel speeds obtained in the present and preceding control cycles, respectively.

Figure 3:
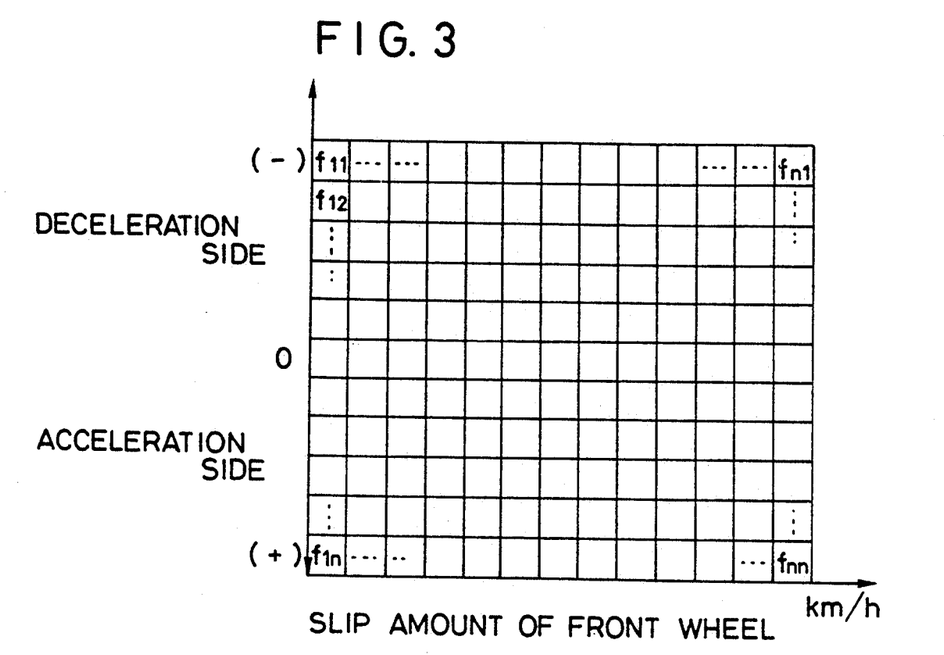
FIG. 3 is a map which defines a value for calculating a variation for the braking pressure of the front wheels in accordance with slip amount and the acceleration of the front wheel.

In Step S3, a variation $\Delta P_{FL}$ of the braking pressure of the wheel brake 9 of the left front wheel $4_L$ is calculated on the basis of the speed $V_{FL}$ and acceleration $G_{FL}$ of the wheel $4_L$. The direction and magnitude of the pressure variation $\Delta P_{FL}$ are calculated in accordance with a braking pressure control map or threshold values of the acceleration and the slip factor for the ABS control set for the front wheels, and in consideration of the reference body speed calculated according to the wheel speeds. More specifically, as shown in FIG. 3, the map defines a value $f_{ii}$ for calculating the pressure variation $\tau P_{FL}$ in accordance with the slip amount of and the acceleration G of the front wheel. Thus, when the acceleration $G_{FL}$ and the slip amount of the front wheel $4_L$ are obtained, the value $f_{ii}$ can be read from the map of FIG. 3 and then the pressure variation $\tau P_{FL}$ can be calculated using the value $f_{ii}$. The slip amount can be calculated basis of the difference between the reference body speed and the wheel speed. Further, the reference wheel speed, e.g., the second highest wheel speed selected among other wheel speeds.

Figure 5:
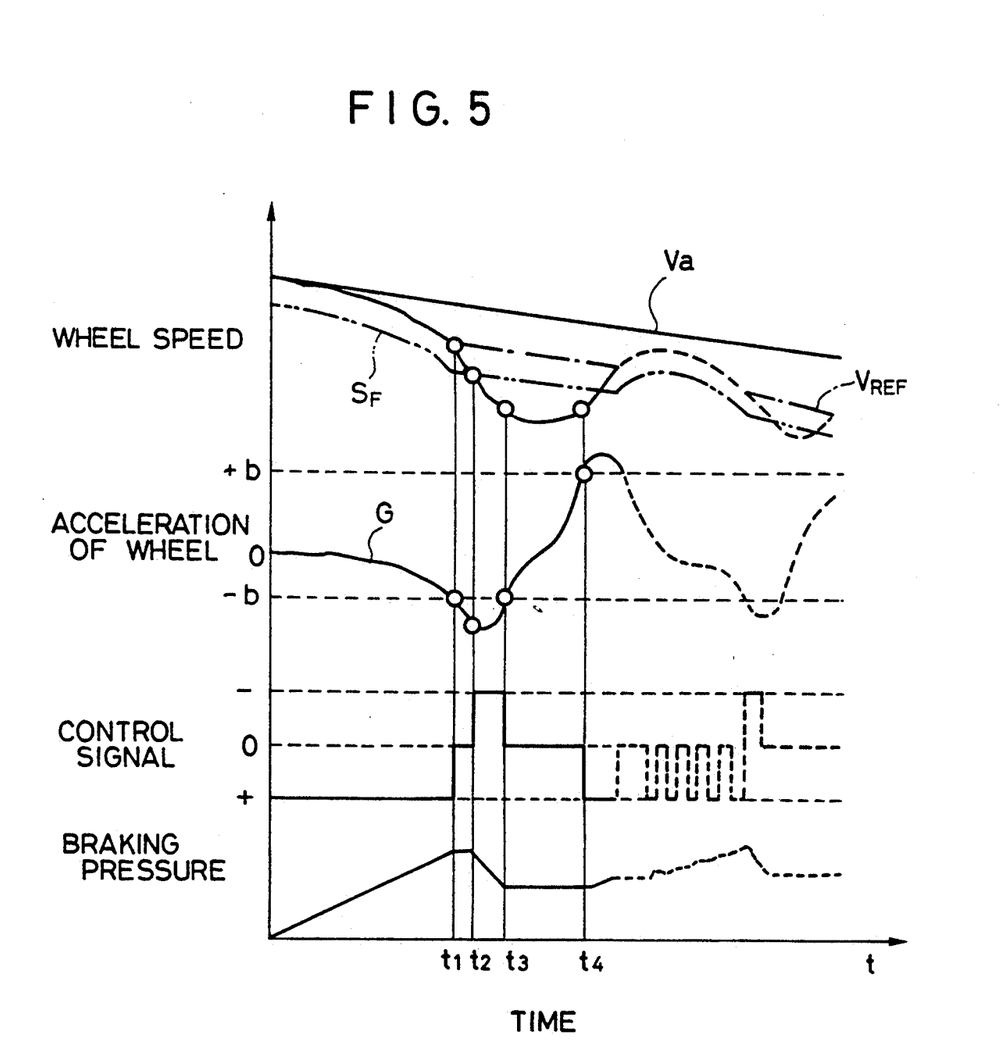
FIG. 5 is a graph showing time-based changes of the wheel speed, the acceleration of the wheel, the control signal for braking pressure and braking pressure of the wheel.

The threshold values b, $-b$ and $S_F$ are used for outputting the control signal from the controller 20 to the antiskid valve unit 16 of the front wheel 4 during the ABS control. As shown in FIG. 5, when the threshold $-b$ is exceeded by the acceleration $G_F$ of the front wheel 4 at time $t_1$ after the brake pedal is worked, the controller 20 outputs the control signal or the hold signal for holding the brake pressure on the front wheel 4, whereby the brake pressure on the front wheel 4 is held. Thereafter, when the threshold $S_F$, which is set at a speed lower than the reference body speed by a predetermined value, is exceeded by the slip factor of the front wheel 4 at time $t_2$, the controller 20 outputs the control signal or the decrease signal to the antiskid valve unit 16 of the front wheel 4, whereby the brake pressure on the front wheel 4 is decreased. While decreasing the brake pressure, the acceleration $G_F$ is restored within the threshold $-b$ at time $t_3$, the controller 20 outputs the hold signal to the antiskid valve unit 16, whereby the brake pressure on the front wheel 4 is held again. On the other hand, when the threshold b is exceeded by the acceleration $G_F$ of the front wheel 4 at time $t_4$, the controller 20 outputs the control signal or the increase signal for increasing the braking pressure on the front wheel 4, whereby the brake pressure on the front wheel 4 is increased. Thus, the pressure variation $\tau P_{FL}$ may be obtained from the relationship between the acceleration $G_F$ and the thresholds b, $-b$ and $S_F$.

In Step S4, a variation $\Delta P_{FR}$ of the braking pressure of the wheel brake 9 of the right front wheel $4_R$ is calculated on the basis of the speed $V_{FR}$ and acceleration $G_{FR}$ of the wheel $4_R$ in the same manner as in Step S3.

In Step S5, thereafter, the respective speeds $V_{RL}$ and $V_{RR}$ of the left and right rear wheels $5_L$ and $5_R$ are compared with each other. In this embodiment, it is determined whether or not the wheel speed $V_{RR}$ is not higher than the wheel speed $V_{RL}$.

Figure 4:
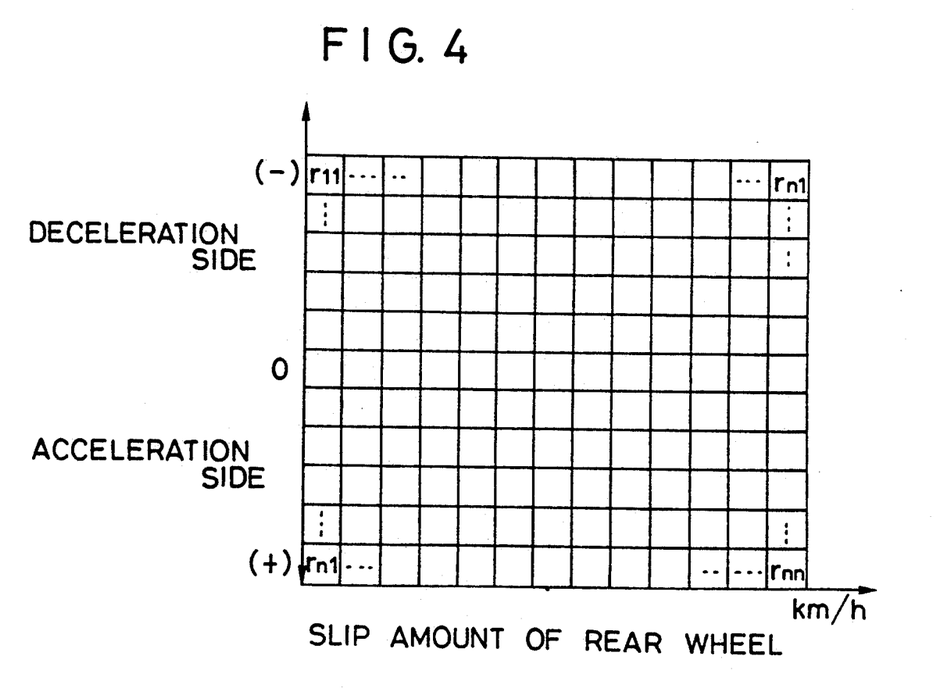
FIG. 4 is a map which defines a value for calculating a variation for the braking pressure of the rear wheels in accordance with slip amount and the acceleration of the rear wheel.

If the decision in Step S5 is YES, it is concluded that the right rear wheel $5_R$ more positively tends to lock than the left rear wheel $5_L$, and the program proceeds to Step S6. In Step S6, variations $\Delta P_R$ of the braking pressures of the respective wheel brakes 9 of the two rear wheels 5 are calculated on the basis of the speed $V_{RR}$ and acceleration $G_{RR}$ of the right rear wheel $5_R$. The respective directions and magnitude of these pressure variations $\Delta P_R$ are calculated in accordance with a braking pressure control map of FIG. 4 or threshold values for the ABS control set for the rear wheels, and also in consideration of the aforementioned reference body speed. Here, it should be noted that the threshold values for the rear wheels 5 are different from the threshold values b, $-b$ and $S_F$.

If the decision in Step S5 is NO, on the other hand, it is concluded that the left rear wheel $5_L$ more positively tends to lock than the right rear wheel $5_R$, and the program proceeds to Step S7 in place of Step S6. In Step S7, the variations $\Delta P_R$ of the braking pressures of the respective wheel brakes 9 of the two rear wheels 5 are calculated on the basis of the speed $V_{RL}$ and acceleration $G_{RL}$ of the left rear wheel $5_L$ in the same manner as in Step S6.

In the ABS control, as is evident from the above description, the braking pressures on the left and right front wheels $4_L$ and $4_R$ are independently controlled on the basis of their respective speeds and accelerations. On the other hand, the braking pressures on the left and right rear wheels $5_L$ and $5_R$ are controlled on the basis of the speed and acceleration of that rear wheel which shows a more marked tendency to lock. Thus, the braking pressures on the left and right rear wheels $5_L$ and $5_R$ are controlled together in accordance with the so-called select-low principle.

Steps S6 and S7 are followed by Steps S8 and S9, respectively. In Step S8 or S9, it is determined whether or not the automobile is running in a four-wheel-drive (4WD) mode. The decision in this step can be made in response to a switching signal from the aforementioned transfer.

If the decision in Step S8 or S9 is NO, that is, when the automobile is running in a two-wheel-drive (2WD) mode, the program skips to Step S10. In Step S10, the operation of each antiskid valve unit 16 is controlled in accordance with the previously obtained braking pressure variations $\Delta P_{FL}$, $\Delta P_{FR}$ and $\Delta P_R$, whereby the braking pressures of their corresponding wheel brakes 9 are decreased, increased, or held, that is, braking pressure control is executed.

If the decision in Step S8 or S9 is YES, that is, when the automobile is running in the 4WD mode, on the other hand, the following sequence of steps is executed before the execution of Step S10.

Thus, if the decision in Step S8, which follows Step S6, is YES, the program proceeds to Step S11. In Step S11, the variation $\Delta P_f$ of the braking pressure of the wheel brakes 9 of the front wheel is calculated on the basis of the speed $V_{RR}$ and acceleration $G_{RR}$ of the right rear wheel $5_R$, in accordance with the braking pressure control map or threshold values for the front wheels. In Step S12, it is determined whether or not the pressure variation $\Delta P_f$ indicates a pressure reduction, that is, whether or not its value is negative. If the decision in Step S12 is NO, the program proceeds to Step S10. If the decision in Step S12 is YES, on the other hand, the value of the aforesaid braking pressure variation $\Delta P_{FR}$ is replaced with the pressure variation $\Delta P_f$, whereupon Step S10 is executed.

If the program proceeds to Step S10 via Step S13, that is, if the pressure variation $\Delta P_F$ obtained in Step S11 is negative when the automobile is running in the 4WD mode, therefore, the braking pressures of the respective wheel brakes 9 of the individual wheels are controlled in accordance with the pressure variations $\Delta P_{FR}$, $\Delta P_{FL}$ and $\Delta P_R$, that is, the variations $\Delta P_f$, $\Delta P_{FL}$ and $\Delta P_R$.

In Steps S6 and S11, the pressure variations $\Delta P_R$ and $\Delta P_f$ are calculated on the basis of the same data, they have the same sign. If the braking pressures on the two rear wheels are reduced, therefore, the braking pressure on the wheel $4_R$, which is situated on the same side as the rear wheel $5_R$ which more positively tends to lock, is reduced at the same time.

If the decision in Step S9, which follows Step S7, is YES, on the other hand, the program proceeds to Step S14. In Step S14, the variations $\Delta P_f$ of the braking pressure of the wheel brake 9 of the front wheel is calculated on the basis of the speed $V_{RL}$ and acceleration $G_{RL}$ of the left rear wheel $5_L$, in accordance with the braking pressure control map or threshold values for the front wheels. In Step S15, as in Step S12, it is determined whether or not the value of the pressure variation $\Delta P_f$ is negative. If the decision in Step S15 is NO, the program proceeds to Step S10. If the decision in Step S15 is YES, on the other hand, the value of the aforesaid braking pressure variation $\Delta P_{FL}$ is replaced with the pressure variation $\Delta P_f$, whereupon Step S10 is executed.

If the program proceeds to Step S10 via Step S16, that is, if the pressure variation $\Delta P_f$ obtained in Step S11 is negative when the automobile is running in the 4WD mode, therefore, the braking pressures of the respective wheel brakes 9 of the individual wheels are controlled in accordance with the pressure variations $\Delta P_{FR}$, $\Delta P_f$ and $\Delta P_R$. Also in Steps S7 and S14, the pressure variations $\Delta P_R$ and $\Delta P_f$ are calculated on the basis of the same data, they have the same sign. If the braking pressures on the two rear wheels are reduced, therefore, the braking pressure on the wheel $4_L$ which is situated on the same side as the rear wheel $5_L$ which more positively tends to lock is reduced at the same time.

Figure 6:
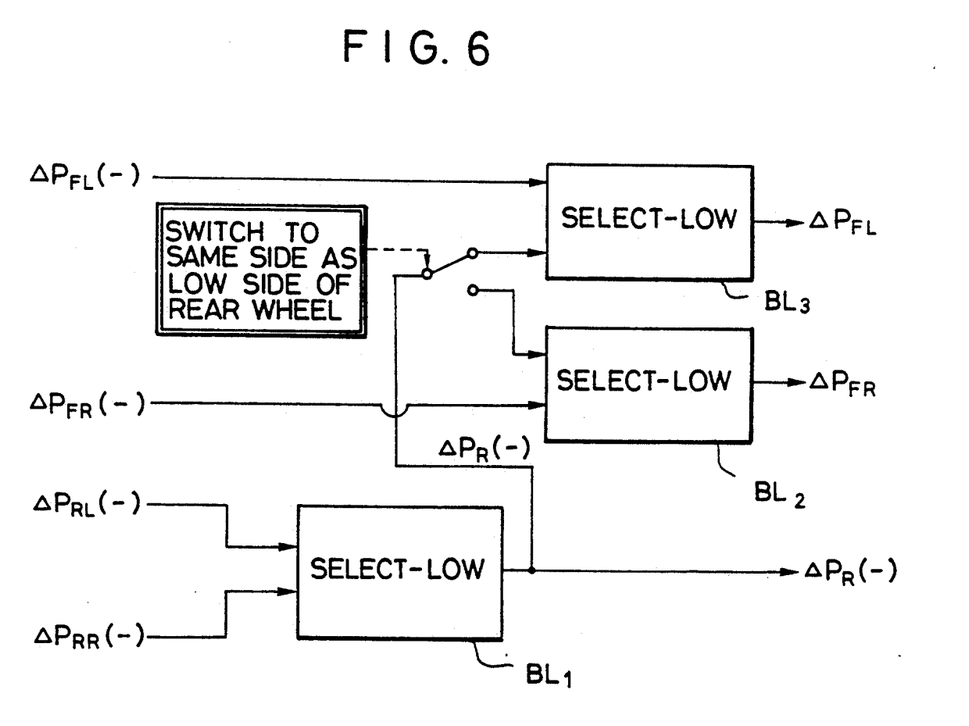
FIG. 6 is a block diagram for illustrating another embodiment of the invention.

While the automobile is running in the 4WD mode, the way of control shown in the flow chart of FIG. 2 may be replaced with the one shown in the block diagram of FIG. 6. Referring to FIG. 6, the variations $\Delta P$ of the braking pressures on the individual wheels are first calculated on the basis of the speeds V and accelerations G of the wheels, in accordance with their corresponding braking pressure control maps or threshold values during the ABS control. During the ABS control, all the calculated pressure variations $\Delta P$ of the wheels are supposed to be pressure reductions. In FIG. 6, therefore, a minus sign ($-$) is affixed to each pressure variation $\Delta P_x$. A block $BL_1$ of FIG. 6 corresponds to the execution of the decision in Step S5 of FIG. 2, while blocks $BL_2$ and $BL_3$ substantially correspond to the execution of Steps S13 and S16 of FIG. 2, respectively.

In the block $BL_1$ of FIG. 6, one of the pressure variations $\Delta P_{RL}$ and $\Delta P_{RR}$ of the two rear wheels 5 is selected as the pressure variation $\Delta P_R$ in accordance with the select-low principle. More specifically, the pressure variation with a greater absolute value is selected as the pressure variation $\Delta P_R$. In one of the blocks $BL_2$ and $BL_3$, the pressure variation $\Delta P_R$ is compared with the pressure variation $\Delta P_{FL}$ or $\Delta P_{FR}$ of the braking pressure on that front wheel which is situated on the same side as the selected rear wheel 5. Then, in the one of the blocks $BL_2$ and $BL_3$, the pressure variation with a greater absolute value, out of the compared pressure variations, is selected in accordance with the select-low principle, and delivered as the variation $\Delta P_{FL}$ or $\Delta P_{FR}$. Also in the case of the block diagram of FIG. 6, therefore, when the braking pressures on the rear wheels are reduced, the braking pressure on that front wheel which is situated on the same side as the rear wheel which more positively tends to lock, that is, the rear wheel whose braking pressure reduction is greater, is reduced at the same time.

According to control method for the antiskid braking system described above, if the rear wheel $5_R$ more positively tends to lock than the rear wheel $5_L$, and if the braking pressure thereon is reduced, during the ABS control, the braking pressure on the front wheel $4_R$ on the same side as the rear wheel $5_R$ can be reduced simultaneously with the braking pressures on the two rear wheels by supplying a pressure reduction signal $D_P$ for the braking pressure to the antiskid braking valve unit 16 associated with the front wheel $4_R$. In this case, therefore, the braking pressures on the one front wheel $4_R$ and the two rear wheels 5 are reduced in synchronism with one another, as indicated by a hatched region A in FIG. 7. It is to be understood that the braking pressure on the other front wheel $4_L$ is controlled independently, as indicated by a hatched region B in FIG. 7.

Figure 7:
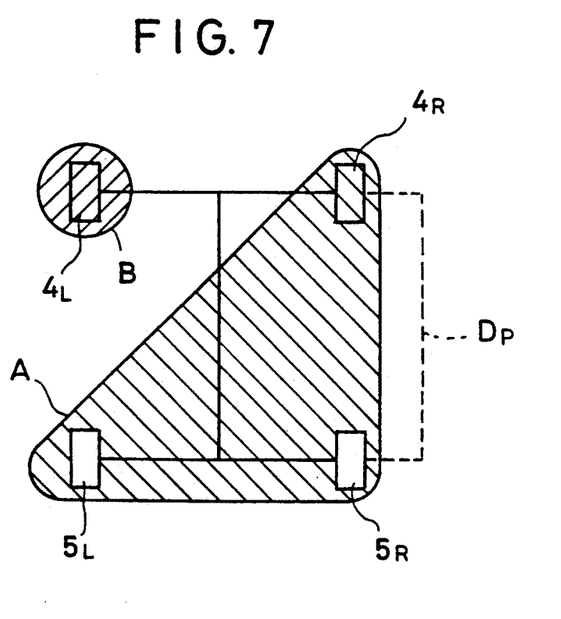
FIGS. 7 and 8 are diagrammatic views showing the way a braking pressure on one of front wheels is reduced when braking pressures on rear wheels are reduced in accordance with the control method of the first embodiment.
Figure 8:
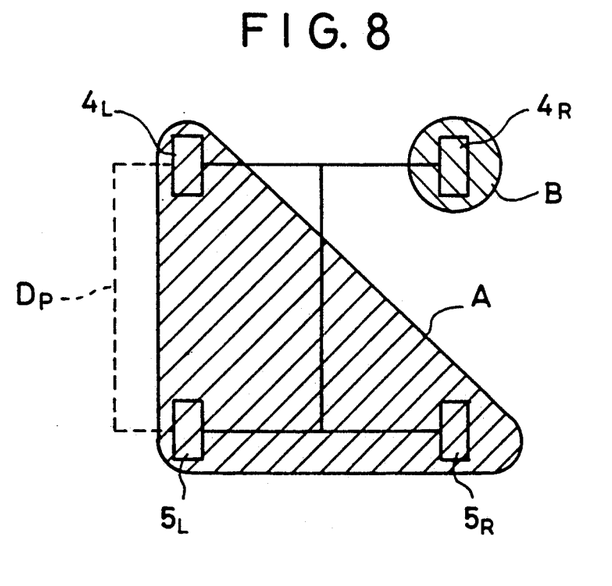

If the rear wheel $5_L$ more positively tends to lock than the rear wheel $5_R$, and if the braking pressure thereon is reduced, during the ABS control, in contrast with the case of FIG. 7, the braking pressure on the front wheel $4_L$ is reduced simultaneously with the braking pressures on the rear wheels 5, as indicated by a hatched region A in FIG. 8. Further, the braking pressure on the other front wheel $4_R$ is controlled independently, as indicated by a hatched region B in FIG. 8.

Figure 9:
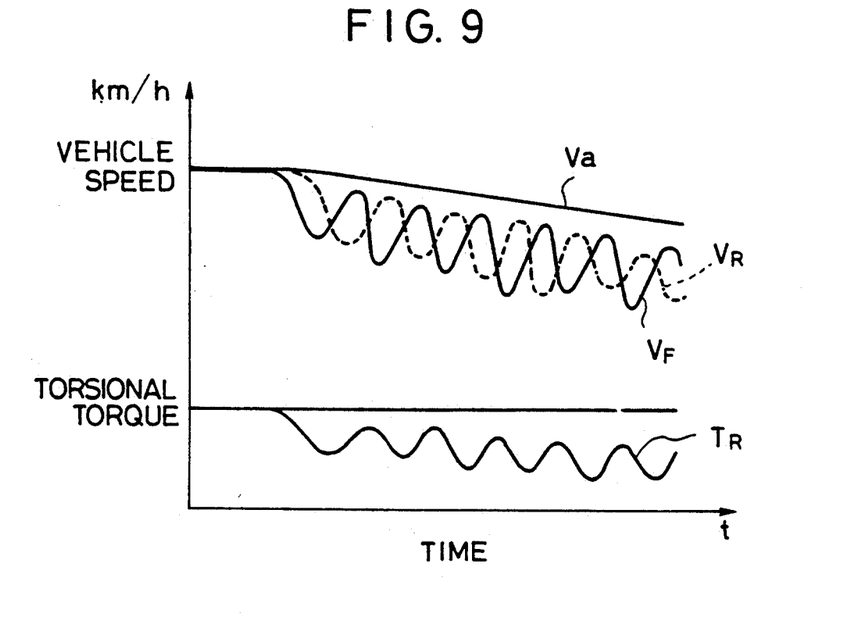
FIG. 9 is a graph showing fluctuations of wheel speeds and variation of torsional torque in a case the control method of the first embodiment is not effected.

When a three-channel braking system is subjected to the conventional ABS control while the automobile is running in the 4WD mode, that is, when the braking pressures on the front wheels are controlled entirely independently of those on the rear wheels, the speed $V_R$ of the each rear wheel 5 starts to lower after the speed $V_F$ of each front wheel 4 is lowered as the braking pressures increase, on account of the distribution of braking forces on the front and rear wheels. Thus, the respective speeds $V_F$ and $V_R$ of the front and rear wheels 4 and 5 start to lower with a phase difference, as shown in FIG. 9. When the rear wheel speed $V_R$ starts to lower after the front wheel speed $V_F$ is lowered, a torsional torque $T_R$ is produced in a drive system which connects the front and rear wheel sides. This torque $T_R$ acts in the direction to rotate the front wheels 4. Those fluctuations of the front and rear wheel speeds $V_F$ and $V_R$ make it difficult to properly control the braking pressures on the individual wheels.

Figure 10:
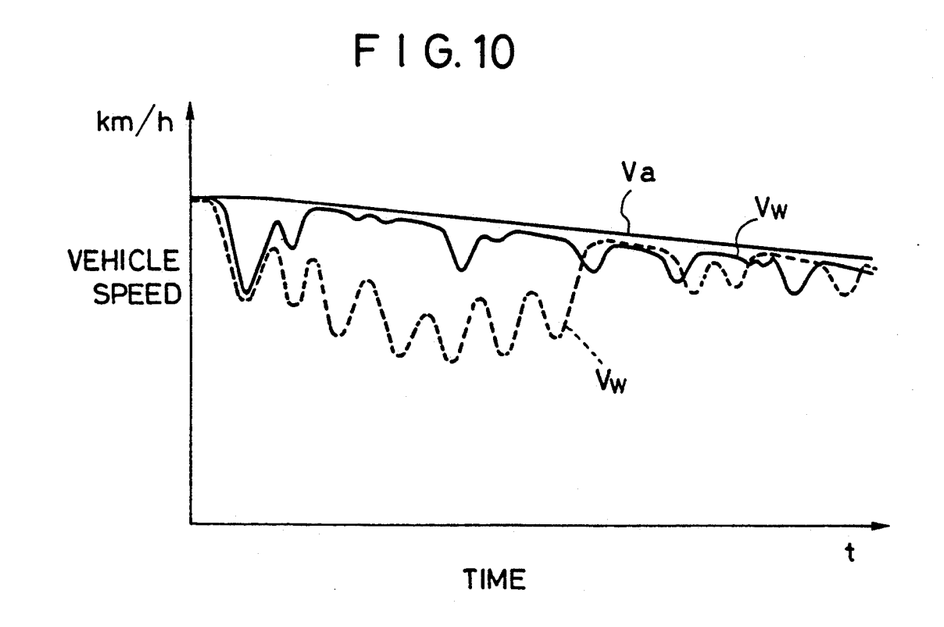
FIG. 10 is a graph showing fluctuations of the wheel speeds obtained when the control method of the first embodiment is effected.

According to the control method of the present invention, however, the fluctuations of the wheel speed $V_W$ are effectively restrained, as indicated by a full-line curve in FIG. 10, and the wheel speed $V_W$ optimally follows up an actual body speed Va, as seen from FIG. 10. The wheel speed $V_W$ indicated by a broken-line curve in FIG. 10 represents a case in which the control method of the invention is not effected. Also in this case, the wheel speed is subject to fluctuations. The wheel speed $V_W$ of FIG. 10 typifies the respective wheel speeds of the front and rear wheels 4 and 5.

Figure 11:
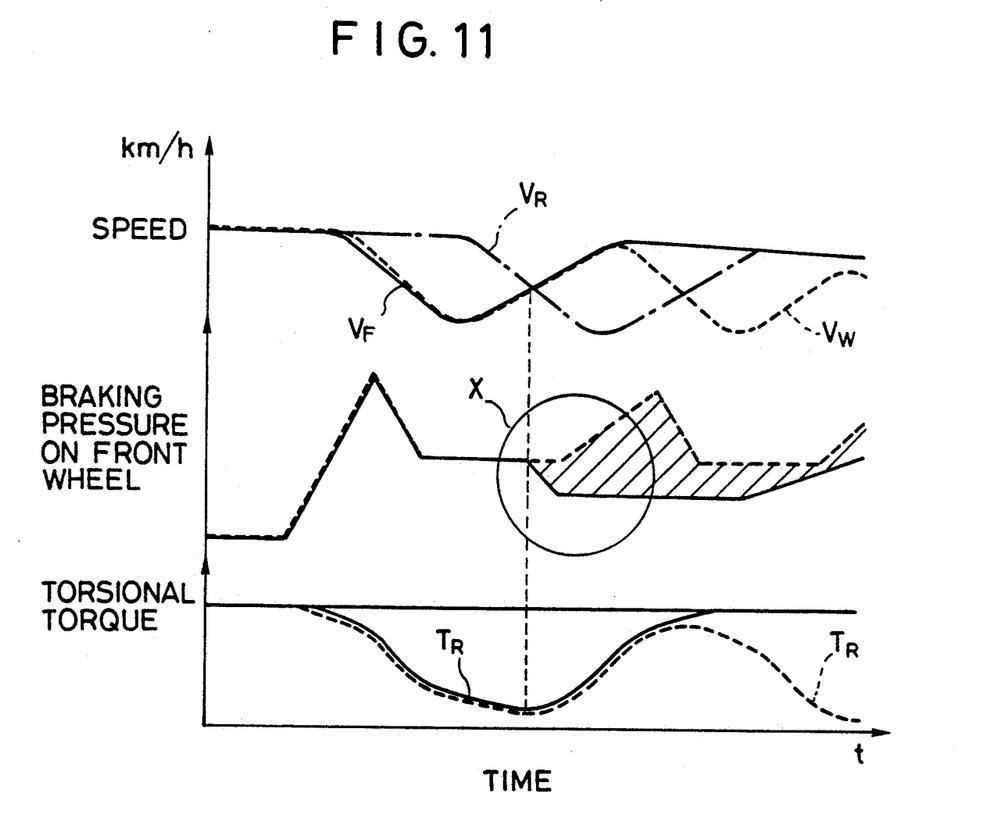
FIG. 11 is a graph showing the effect of the control method of the first embodiment.

The function to prevent the fluctuations of the wheel speeds, which constitutes an advantage of the control method of the present invention, will be more apparent from FIG. 11. In FIG. 11, the respective speeds $V_F$ and $V_R$ of the front and rear wheels 4 and 5 obtained immediately after the start of the ABS control are illustrated together with changes of the braking pressures on the front wheels. When the ABS control is started by working the brake pedal 11, the front and rear wheel speeds $V_F$ and $V_R$ are lowered with a phase difference in the aforesaid manner, as shown in FIG. 11.

In this case, the rotational phase difference between the front and rear wheels 4 and 5 causes the aforementioned torsional torque $T_R$ to act on the drive system. As the wheel speed $V_F$ lowers, the braking pressures on the front wheels 4 start to be reduced to restore the speed $V_F$. As the wheel speed $V_F$ is restored in this manner, the torsional torque $T_R$ increases. This increase continues until the wheel speeds $V_F$ and $V_R$ become equal to each other, that is, until the curves representing the wheel speeds $V_F$ and $V_R$ meet in FIG. 11. Since the braking pressures on the rear wheels start to be reduced before the point of time corresponding to this meeting point, the torsional torque $T_R$ accumulated in the drive system acts in the direction to increase the front wheel speed $V_F$ rapidly.

In order to prevent the rapid increase of the wheel speed $V_F$ by the torsional torque $T_R$, therefore, the conventional ABS control is effected in a manner such that the braking pressure on the front wheels 4 are raised again, as indicated by a broken-line curve in circle X of FIG. 11, to lower the wheel speed $V_F$. Thus, according to the conventional ABS control, the torsional torque $T_R$ can be also increased by increasing the braking pressures on the front wheels 4, so that it cyclically varies by a large margin, as shown in FIG. 9. Due to a phase difference caused when the wheel speeds $V_F$ and $V_R$ lower, and to the repeated braking pressure control for the front and rear wheels 4 and 5 with a phase difference attributable thereto, therefore, the front wheel speed $V_F$ varies or fluctuates, and the rear wheel speed $V_R$ also fluctuates.

According to the control method according to the present invention, however, when the rear wheel speed $V_F$ is lowered, and if the braking pressures on the rear wheels 5 are reduced to restore the $V_F$, the braking pressure on that front wheel 4 on the same side as the select-low-side rear wheel 5 is reduced at the same time, as indicated by a full-line curve in circle X of FIG. 11, so that the braking pressures between the front and rear wheel sides are controlled in substantially the same phase. According to the present invention, therefore, a region (hatched in FIG. 11) for the increase of the braking pressures on the front wheels which entails fluctuations of the wheel speed can be eliminated, so that the next cycle of braking pressure control can be started after the torsional torque $T_R$ in the drive system is entirely released or reduced to zero. Thus, the torsional torque $T_R$ in the drive system can be effectively restrained from increasing and from cyclically varying, whereby the fluctuations of the speeds $V_F$ and $V_R$ of the front and rear wheels 4 and 5 can be effectively prevented.

In FIG. 11, broken-line curves individually represent the wheel speed $V_W$ and the torsional torque $T_R$ in the drive system used in the conventional ABS control.

It is to be understood that the present invention is not limited to the embodiment described above and should be defined solely by the claims appended hereto. Further, the present invention should encompass various changes and modifications that may be effected therein by one skilled in the art without departing from the scope or spirit of the invention.

In the above-described embodiment, for example, the reduction of the braking pressure on the target front wheel 4 is obtained in accordance with the braking pressure control map or threshold values for the front wheels, based on the speed and acceleration of the rear wheel selected by the select-low principle, when the braking pressures on the two rear wheels 5 are being reduced during the ABS control. The braking pressure control map or threshold values for the front wheels may, however, be replaced with one for the rear wheels.

Figure 12:
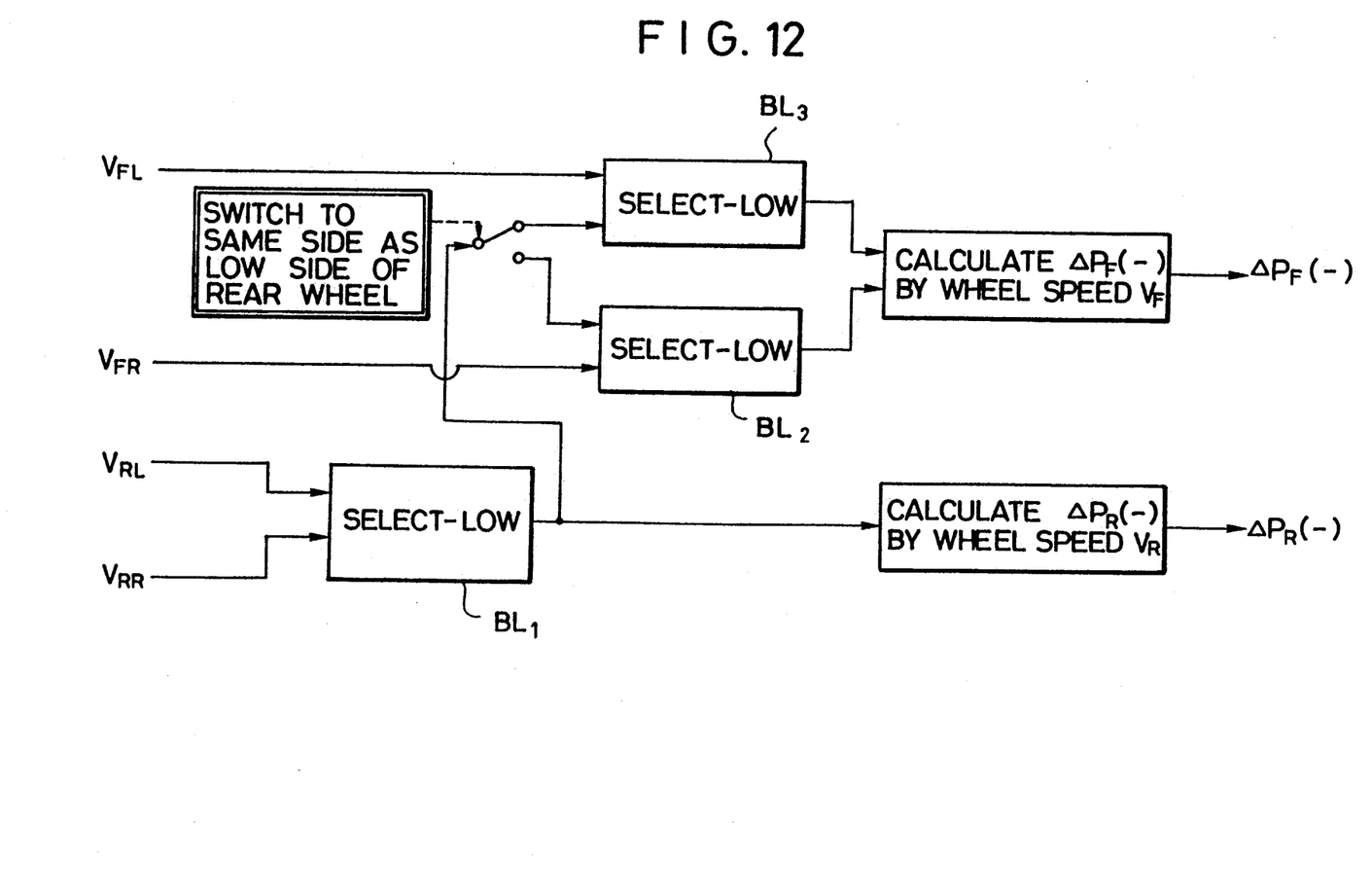
FIG. 12 is a block diagram showing still another embodiment of the invention.

FIG. 12 is a block diagram showing the way of calculating the reduction of the braking pressure on the target front wheel 4 caused when the braking pressures on the rear wheels 5 are being reduced during the ABS control. As shown in FIG. 12, the speed of that rear wheel 5 which more positively tends to lock and that of the target front wheel 4 may be selected in accordance with the select-low principle so that the reduction of the braking pressure on the front wheel can be calculated on the basis of the selected wheel speeds.

What is claimed is:

1. A control method for an antiskid braking system incorporated in a four-wheel-drive automobile, the antiskid braking system including wheel speed sensors attached individually to left and right front wheels and left and right rear wheels of the automobile to detect and output the respective speeds of the wheels, wheel brakes attached individually to each of the four wheels, and a controller for controlling the respective braking pressures of the wheel brakes, said control method comprising the steps of:

(a) controlling the braking pressure of the wheel brake for one of the front wheels independently of the braking pressure of the wheel brake for the other front wheel by means of the controller, on the basis of the output of the wheel speed sensor for the one front wheel, when the one front wheel develops a tendency to lock;

(b) controlling the respective braking pressures of the wheel brakes for the two rear wheels, simultaneously, by means of the controller, on the basis of the output of the wheel speed sensor for a concerned rear wheel, whose tendency to lock is found to be higher by comparison between the two rear wheels, when at least one of the rear wheels develops a tendency to lock, said step (b) being executed independently of said step (a); and (c) reducing the braking pressure of the wheel brakes for a target front wheel, situated on the same side as the concerned rear wheel, by means of the controller, at the same time that the respective braking pressures of the wheel brakes for the two rear wheels are reduced at said step (b).

2. A control method for an antiskid braking system incorporated in an automobile whose drive mode is changeable between a two-wheel-drive mode and a four-wheel-drive mode, the antiskid braking system including wheel speed sensors attached individually to left and right front wheels and left and right rear wheels of the automobile to detect and output the respective speeds of the wheels, wheel brakes attached individually to each of the four wheels, and a controller for controlling the respective braking pressures of the wheel brakes, said control method comprising the steps of:

(a) controlling the braking pressure of the wheel brake for one of the front wheels independently of the braking pressure of the wheel brake for the other front wheel by means of the controller, on the basis of the output of the wheel speed sensor for the one front wheel, when the one front wheel develops a tendency to lock;

(b) controlling the respective braking pressures of the wheel brakes for the two wheels, simultaneously, by means of the controller, on the basis of the output of the wheel speed sensor for a concerned rear wheel, whose tendency to lock is found to be higher by comparison between the two rear wheels, when at least one of the rear wheels develops a tendency to lock; and (c) reducing the braking pressure of the wheel brake for a target front wheel, situated on the same side as the concerned rear wheel, by means of the controller, at the same time that the respective braking pressures of the wheel brakes for the two rear wheels are reduced at said step (b), said step (c) being executed only while the automobile is running in the four-wheel-drive mode.

3. The control method of claim 1, wherein the method further comprises the step of (d) obtaining the speeds and accelerations of the wheels on the basis of outputs from the wheel speed sensors prior to said steps (a)-(c), and wherein said step (c) includes calculating a reduction of the braking pressure on the target front wheel on the basis of the speed and acceleration of the concerned rear wheel.

4. The control method of claim 3, wherein the method further comprises the step of (e) preparing one of a braking pressure control map and a plurality of threshold values for the front wheels, used to determine reductions of braking pressures on the front wheels prior to said steps (a)-(d), and wherein said reduction of the braking pressure on the target front wheel is determined by the speed and acceleration of the concerned rear wheel in accordance with the one of the braking pressure control map and the plurality of threshold values for the front wheels, in the calculation of step (c).

5. The control method of claim 3, further comprising the step of (e) preparing one of a braking pressure control map and a plurality of threshold values for the rear wheels used to determine reductions of braking pressures on the rear wheels prior to said steps (a)-(d), and wherein said reduction of the braking pressure on the target front wheel is determined by the speed and acceleration of the concerned rear wheel in accordance with the one of the braking pressure control map and the plurality of threshold values for the rear wheels, in the calculation of step (c).

6. The control method of claim 1, wherein said reduction of the braking pressure on the target front wheel is set on the basis of a lower wheel speed, selected by a comparison between a wheel speed obtained from that wheel speed sensor associated with the concerned rear wheel and a wheel speed obtained from that wheel speed sensor associated with the target front wheel, in the calculation of step (c).

7. The control method of claim 1, wherein said reduction of the braking pressure on the target front wheel is set on the basis of a lower wheel speed, selected by a comparison between a wheel speed obtained from that wheel speed sensor associated with the concerned rear wheel and a wheel speed obtained from that wheel speed sensor associated with the target front wheel, in the calculation of step (c).

8. The control method of claim 2, wherein the method further comprises the step of:

(d) obtaining the speeds and accelerations of the wheels on the basis of outputs from the wheel speed sensors prior to said steps (a)-(c), and wherein said step (c) includes calculating a reduction of the braking pressure on the target front wheel on the basis of the speed and acceleration of the concerned rear wheel.

9. The control method of claim 8, wherein the method further comprises the step of:

(e) preparing one of a braking pressure control map and a plurality of threshold values for the front wheels, used to determined reductions of braking pressures on the front wheels prior to said steps (a)-(d), and wherein said reduction of the braking pressure on the target front wheel is determined by the speed and acceleration of the concerned rear wheel in accordance with the one of the braking pressure control map and the plurality of threshold values for the front wheels, in the calculation of step (c).

10. The control method of claim 8, further comprising the step of:

(e) preparing one of a braking pressure control map and a plurality of threshold values for the rear wheels used to determine reductions of braking pressures on the rear wheels prior to said steps (a)-(d), and wherein said reduction of the braking pressure on the target front wheel is determined by the speed and acceleration of the concerned rear wheel in accordance with the one of the braking pressure control map and the plurality of threshold values for the front wheels, in the calculation of step (c).

11. The control method of claim 2, wherein said reduction of the braking pressure on the target front wheel is set on the basis of a lower wheel speed, selected by a comparison between a wheel speed obtained from that wheel speed sensor associated with the concerned rear wheel and a wheel speed obtained from that wheel speed sensor associated with the target front wheel, in the calculation of step (c).

12. The control method of claim 2, wherein said reduction of the braking pressure on the target front wheel is set on the basis of a lower wheel speed, selected by a comparison between a wheel speed obtained from that wheel speed sensor associated with the concerned rear wheel and a wheel speed obtained from that wheel speed sensor associated with the target front wheel, in the calculation of step (c).

13. A control apparatus for an antiskid braking system incorporated in a four-wheel-drive automobile, the antiskid braking system including wheel speed sensors attached individually to left and right front wheels and left and right rear wheels of the automobile to detect and output the respective speeds of the wheels, and wheel brakes attached individually to each of the four wheels, said control apparatus comprising:

first means for controlling the braking pressure of the wheel brake for one of the front wheels independently of the braking pressure of the wheel brake for the other front wheel on the basis of the output of the wheel speed sensor for the one front wheel, when the one front wheel develops a tendency to lock;

second means for controlling the respective braking pressures of the wheel brakes for the two rear wheels, simultaneously, on the basis of the output of the wheel speed sensor for a concerned rear wheel, whose tendency to lock is found to be higher by comparison between the two rear wheels, when at least one of the rear wheels develops a tendency to lock, said first means being executed independently of said second means; and third means for reducing the braking pressure of the wheel brakes for a target front wheel, situated on the same side as the concerned rear wheel, at the same time that the respective braking pressures of the wheel brakes for the two rear wheels are reduced by said second means.

14. A control apparatus for an antiskid braking system incorporated in an automobile whose drive mode is changeable between a two-wheel-drive mode and a four-wheel-drive mode, the antiskid braking system including wheel speed sensors attached individually to left and right front wheels and left and right rear wheels of the automobile to detect and output the respective speeds of the wheels, and wheel brakes attached individually to each of the four wheels, said control method comprising:

first means for controlling the braking pressure of the wheel brake for one of the front wheels independently of the braking pressure of the wheel brake for the other front wheel on the basis of the output of the wheel speed sensor for the one front wheel, when the one front wheel develops a tendency to lock;

second means for controlling the respective braking pressures of the wheel brakes for the two wheels, simultaneously, on the basis of the output of the wheel speed sensor for a concerned rear wheel, whose tendency to lock is found to be higher by comparison between the two rear wheels, when at least one of the rear wheels develops a tendency to lock; and third means for reducing the braking pressure of the wheel brake for a target front wheel, situated on the same side as the concerned rear wheel, at the same time that the respective braking pressures of the wheel brakes for the two rear wheels are reduced by said second means, said third means only operating while the automobile is running in the four-wheel-drive mode.

* * * * *